US008265923B2

(12) United States Patent
Chatterjee et al.

(10) Patent No.: US 8,265,923 B2
(45) Date of Patent: Sep. 11, 2012

(54) STATISTICAL MACHINE TRANSLATION EMPLOYING EFFICIENT PARAMETER TRAINING

(75) Inventors: Samidh Chatterjee, Tallahassee, FL (US); Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 337 days.

(21) Appl. No.: 12/777,613

(22) Filed: May 11, 2010

(65) Prior Publication Data

US 2011/0282643 A1 Nov. 17, 2011

(51) Int. Cl.
*G06F 17/28* (2006.01)
(52) U.S. Cl. ............. 704/2; 704/3; 704/4; 704/5; 704/7; 704/8; 715/264
(58) Field of Classification Search .................. 704/2–8; 715/264
See application file for complete search history.

(56) References Cited

U.S. PATENT DOCUMENTS

| | | | | | |
|---|---|---|---|---|---|
| 4,829,580 | A | * | 5/1989 | Church | 704/260 |
| 5,477,451 | A | * | 12/1995 | Brown et al. | 704/9 |
| 5,510,981 | A | * | 4/1996 | Berger et al. | 704/2 |
| 5,991,710 | A | * | 11/1999 | Papineni et al. | 704/2 |
| 6,304,841 | B1 | * | 10/2001 | Berger et al. | 704/2 |
| 7,346,487 | B2 | * | 3/2008 | Li | 704/2 |
| 8,060,360 | B2 | * | 11/2011 | He | 704/9 |
| 8,175,864 | B1 | * | 5/2012 | Dubiner | 704/2 |
| 8,185,375 | B1 | * | 5/2012 | Kumar et al. | 704/4 |
| 2004/0098247 | A1 | * | 5/2004 | Moore | 704/4 |
| 2005/0021323 | A1 | * | 1/2005 | Li | 704/5 |
| 2006/0015320 | A1 | * | 1/2006 | Och | 704/2 |
| 2007/0150257 | A1 | * | 6/2007 | Cancedda et al. | 704/2 |
| 2008/0015842 | A1 | * | 1/2008 | Moore | 704/4 |
| 2008/0120092 | A1 | * | 5/2008 | Moore et al. | 704/4 |
| 2008/0262829 | A1 | * | 10/2008 | Liu et al. | 704/4 |
| 2008/0270109 | A1 | * | 10/2008 | Och | 704/2 |
| 2009/0106015 | A1 | * | 4/2009 | Li et al. | 704/2 |
| 2009/0192781 | A1 | * | 7/2009 | Bangalore et al. | 704/2 |
| 2009/0271177 | A1 | * | 10/2009 | Menezes et al. | 704/2 |
| 2009/0326913 | A1 | * | 12/2009 | Simard et al. | 704/2 |
| 2010/0004919 | A1 | * | 1/2010 | Macherey et al. | 704/4 |
| 2010/0004920 | A1 | * | 1/2010 | Macherey et al. | 704/4 |
| 2010/0023315 | A1 | * | 1/2010 | Quirk | 704/3 |
| 2010/0179803 | A1 | * | 7/2010 | Sawaf et al. | 704/2 |
| 2011/0093254 | A1 | * | 4/2011 | Kuhn et al. | 704/2 |
| 2011/0191096 | A1 | * | 8/2011 | Sarikaya et al. | 704/3 |

OTHER PUBLICATIONS

Cancedda et al., Translating with non-contiguous phrases, 2005, Proceeding HLT, pp. 755-762.*
Cancedda, A Statistical Machine Translation Primer, 2009, Learning Machine Tranlation, pp. 1-37.*
Cer et al., "Regularization and Search for Minimum Error Rate Training," Proceedings of the Third Workshop on Statistical Machine Translation, Columbus, Ohio, pp. 26-34, Jun. 2008.

(Continued)

*Primary Examiner* — David R Hudspeth
*Assistant Examiner* — Lamont Spooner
(74) *Attorney, Agent, or Firm* — Fay Sharpe LLP

(57) ABSTRACT

A statistical machine translation (SMT) system employs a conditional translation probability conditioned on the source language content. A model parameters optimization engine is configured to optimize values of parameters of the conditional translation probability using a translation pool comprising candidate aligned translations for source language sentences having reference translations. The model parameters optimization engine adds candidate aligned translations to the translation pool by sampling available candidate aligned translations in accordance with the conditional translation probability.

11 Claims, 4 Drawing Sheets

OTHER PUBLICATIONS

Chiang et al., "Online Large-Margin Training of Syntactic and Structural Translation Features," Proceedings of the 2008 Conference on Empirical Methods in Natural Language Processing, Honolulu, pp. 224-233, Oct. 2008.

Duh et al., "Beyond Log-Linear Models: Boosted Minimum Error Rate Training for N-best Re-ranking," Proceedings of ACL-08: HLT, Short Papers (Companion Volume), Columbus, Ohio, pp. 37-40, Jun. 2008.

Kumar et al, "Efficient Minimum Error Rate Training and Minimum Bayes-Risk Decoding for Translation Hypergraphs and Lattices," Proceedings of the 47th Annual Meeting of the ACL and the 4th IJCNLP of the AFNLP, Suntec, Singapore, pp. 163-171, Aug. 2009.

Macherey et al., "Lattice-based Minimum Error Rate Training for Statistical Machine Translation," Proceedings of the 2008 Conference on Empirical Methods in Natural Language Processing, Honolulu, pp. 725-734, Oct. 2008.

Och, "Minimum Error Rate Training in Statistical Machine Translation," in ACL '03: Proceedings of the 41st Annual Meeting on Association for Computational Linguistics, Morristown, NJ, pp. 160-167, 2003.

Papineni et al., "BLEU: a Method for Automatic Evaluation of Machine Translation," in ACL '02: Proceedings of the 40th Annual Meeting on Association for Computational Linguistics, Morristown, NJ, pp. 311-318, 2002.

Smith et al., "Minimum Risk Annealing for Training Log-Linear Models," Proceedings of the COLING/ACL 2006 Main Conference Poster Sessions, Sydney, pp. 787-794, Jul. 2006.

Watanabe et al., "Online Large-Margin Training for Statistical Machine Translation," Proceedings of the 2007 Joint Conference on Empirical Methods in Natural Language Processing and Computational Natural Language Learning, Prague, pp. 764-773, Jun. 2007.

Zens et al., "A Systematic Comparison of Training Criteria for Statistical Machine Translation," Proceedings of the 2007 Joint Conference on Empirical Methods in Natural Language Processing and computational Natural Language Learning, Prague, pp. 524-532, Jun. 2007.

* cited by examiner

STATISTICAL MACHINE TRANSLATION EMPLOYING EFFICIENT PARAMETER TRAINING

BACKGROUND

The following relates to the machine translation arts, the statistical machine translation arts, and so forth.

Machine (or automated) translation from a source language to a target language is known. For example, such machine translation may automatically translate a source-language sentence in English, French, Chinese, or another natural language, to a corresponding target-language sentence in another natural language. Some machine translation systems further include a user interface via which the machine translation is presented to a user as a proposed translation, which may be accepted, rejected, or modified by the user via the user interface.

In translation memory systems, a translation memory stores previously translated text as source language content and corresponding translated target language content, with corresponding textual units (e.g., words, phrases, sentences, or so forth) in the source and target languages associated together. When source-language content is received for translation, it is compared with the source-language contents of the translation memory. If a match, or approximate match, is found, the corresponding aligned target language content is presented to the user. If the match is approximate, the user may also be informed of the differences. The translation memory approach depends upon the memory contents being accurate and sufficiently comprehensive to encompass a usefully large portion of the source-language content received for translation.

Another known technique for machine translation is statistical machine translation (SMT). In this approach, a database of source-language/target language phrases are stored as a phrase table. (The term "phrase" as used herein and in the SMT literature generally is to be understood as a unit of text, e.g. a word or sequence of words, in some instances possibly including punctuation—the term "phrase" is not limited herein or in the SMT literature generally to grammatical phrases.) A translation model is provided or developed. This model comprises an aligned translation conditional probability. The "aligned translation" comprises one or more target language phrases in a particular sequence (i.e., alignment), with each target language phrase corresponding to a phrase of the source language content. In operation, the SMT generates candidate translations for received source language content to be translated by selecting target language phrases from the phrase table that match source language phrases of the source language content. The translation model is used to assess the candidate translations so as to select a translation having a high probability as assessed by the model. Since the number of candidate translations can be too large to exhaustively search, in some SMT configurations the translation model is used to guide the generation of candidate translations, for example by modifying a previously generated candidate translations to generate new candidate translations having high probabilities as assessed by the model.

Similarly to the translation memory approach, SMT depends on the comprehensiveness and accuracy of the phrase table. However, since the phrases are generally substantially shorter that textual units of a translation memory, it is generally easier to generate an accurate and reasonably comprehensive phrase table. SMT also depends on the accuracy of the translation model. Toward this end, the translation model is generally constructed to be "tunable", that is, the translation model includes model parameters that can be optimized based on a development dataset comprising source language sentences and corresponding aligned target language translations.

The following discloses various improvements in machine translation apparatuses and methods.

BRIEF DESCRIPTION

In some illustrative embodiments disclosed as illustrative examples herein, a method comprises: translating source language content in a source natural language to a target natural language using statistical machine translation (SMT) employing a conditional translation probability conditioned on the source language content; and optimizing values of parameters of the conditional translation probability by an iterative optimization process operating on a translation pool, the optimizing including adding candidate aligned translations to the translation pool by sampling available candidate aligned translations for a source language sentence in accordance with the conditional translation probability. The SMT and the optimizing are suitably implemented by a SMT system embodied by at least one digital processor.

In some illustrative embodiments disclosed as illustrative examples herein, a statistical machine translation (SMT) system is embodied by at least one digital processor performing the method of the immediately preceding paragraph. In some illustrative embodiments disclosed as illustrative examples herein, a storage medium stores instructions executable on a digital processor to perform the method of the immediately preceding paragraph.

In some illustrative embodiments disclosed as illustrative examples herein, a storage medium stores instructions executable on a digital processor to perform a method including (i) translating source language content in a source natural language to a target natural language based on a conditional translation probability conditioned on the source language content and (ii) tuning the conditional translation probability using a translation pool, wherein the tuning includes (I) selecting candidate aligned translations for a source language sentence having a reference translation by sampling available candidate aligned translations for the source language sentence in accordance with the conditional translation probability conditioned on the source language sentence, and (II) adding the selected candidate aligned translations to the translation pool.

In some illustrative embodiments disclosed as illustrative examples herein, an apparatus comprises: a statistical machine translation (SMT) system employing a conditional translation probability conditioned on the source language content; and a model parameters optimization engine configured to optimize values of parameters of the conditional translation probability using a translation pool comprising candidate aligned translations for source language sentences having reference translations, the model parameters optimization engine adding candidate aligned translations to the translation pool by sampling available candidate aligned translations in accordance with the conditional translation probability. The SMT system and the model parameters optimization engine are suitably embodied by one or more digital processors.

DETAILED DESCRIPTION

Figure 1:
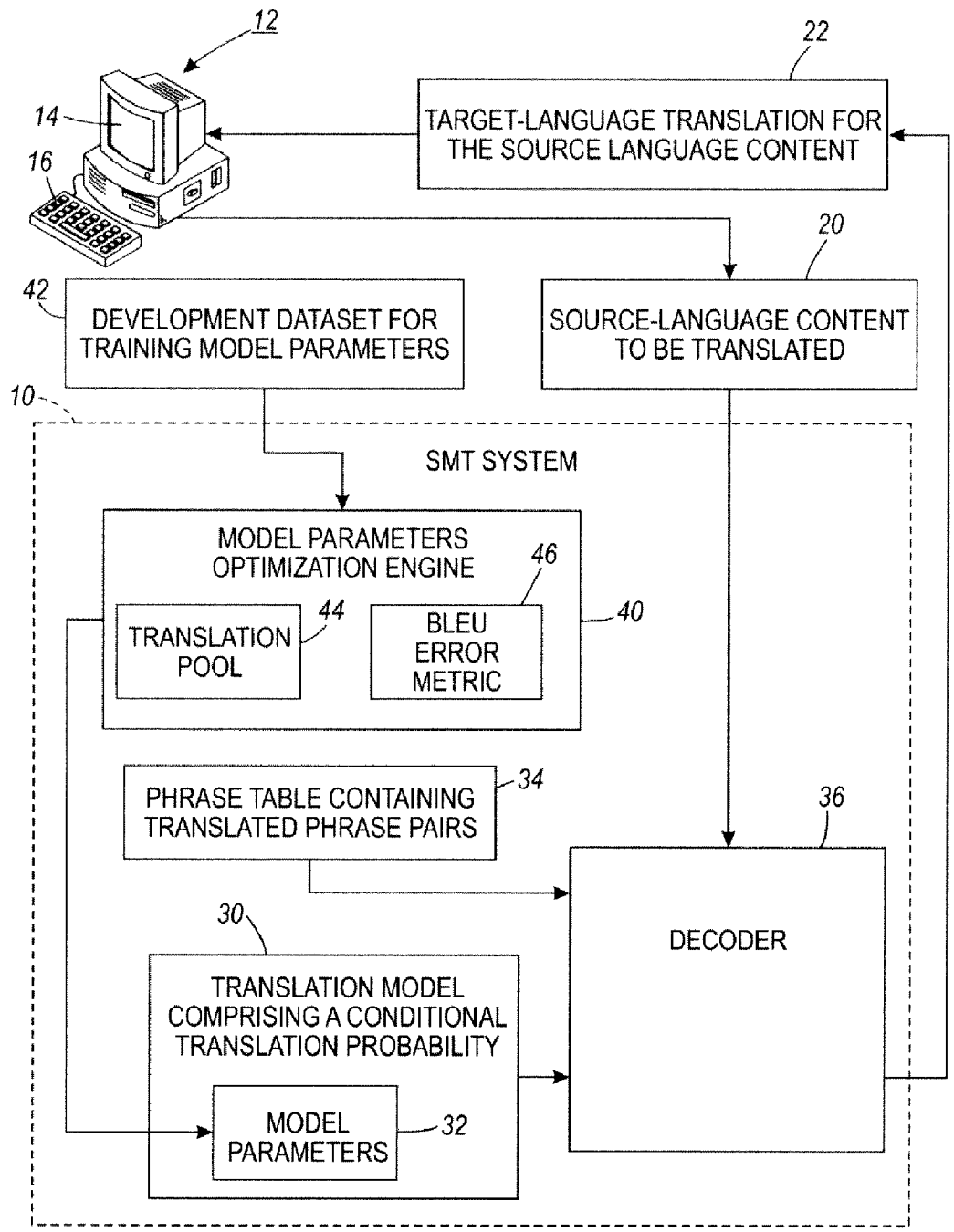
FIG. 1 diagrammatically shows a statistical machine translation (SMT) system including a model parameter optimization engine as set forth herein.

With reference to FIG. 1, a statistical machine translation (SMT) system 10 is suitably implemented by one or more computers, such as an illustrative computer 12 having a display 14 or other user interfacing output device and a keyboard 16, mouse (not shown), or other user interfacing input device. The one or more computers include at least one digital processor (not illustrated) configured by software, firmware, or a combination thereof to perform statistical machine translation, that is, configured to embody the SMT system 10. More generally, the SMT system 10 is embodied by one or more digital processors, which may in general be processors of computers, processors of handheld digital devices, or one or more other suitably programmed microprocessors, microcontrollers, or so forth. The user interfacing components 12, 14 are used by a human user to formulate a translation request comprising content 20 expressed in a source natural language. The SMT system 10 generates a translation 22 of the content 20 in a target natural language, which is then displayed on the display 14 or otherwise utilized.

It is also contemplated to omit a human user from the processing. For example, the source language content 20 may be generated automatically, for example by an application program that extracts the source language content 20 from a document. Similarly, the target language translation 22 may be utilized automatically, for example by the application program in constructing a translated version of the document in the target language.

For embodiments in which the SMT system 10 is embodied by one or more digital processors of one or more computers, it is to be understood that the one or more computers may include one or more desktop computers, one or more notebook computers, one or more network servers, one or more Internet servers, or various combinations thereof.

In some embodiments, the one or more computers include a user-interfacing computer including the user interfacing components 14, 16, and a separate network server computer having one or more digital processors configured to perform the statistical machine translation. In such embodiments, the user interfacing computer is employed by a human user to formulate a translation request comprising content expressed in a source natural language, and this content is communicated via the network (for example, a wired local area network, a wireless local area network, the Internet, some combination thereof, or so forth) to the server computer hosting the SMT system 10, and a translation of the content in a target natural language is then communicated back via the network to the user interfacing computer where the translation is displayed on the display 14 or is otherwise conveyed to the human user.

In some embodiments, the one or more computers include a single computer including the user interfacing components 14, 16, and also including the one or more digital processors configured to perform the statistical machine translation. In such embodiments, the user interfacing computer is employed by a human user to formulate a translation, the included one or more digital processors perform the statistical machine translation, and the resulting translation is displayed on the display 14 of the computer.

In some embodiments, a storage medium (not illustrated) stores instructions executable on a digital processor to perform the disclosed statistical machine translation techniques including the disclosed parameter optimization embodiments. The storage medium may include, for example, one or more of the following: a hard disk or other magnetic storage medium; an optical disk or other optical medium; a read-only memory (ROM), electronically erasable programmable read-only memory (EEPROM), flash memory, random access memory (RAM) or other electronic storage medium; a combination of two or more of the foregoing; or so forth.

With continuing reference to FIG. 1, the SMT system 10 translates the source language content 20 in the source natural language to the target natural language (so as to generate the translation 22) using statistical machine translation (SMT) employing a translation model 30 comprising a conditional translation probability conditioned on the source language content. The translation model 30 receives source language content and a possible translation for the received source language content, and computes a conditional translation probability for the translation that is conditioned on the received source language content. The received source language content is denoted herein as f. The received corresponding translation whose conditional probability is conditioned on f is to be computed is denoted as (e,a). This translation is an aligned translation, by which it is meant that the set of phrases e have a specified alignment a respective to corresponding phrases of the source language content f. If the source language content f is a single phrase, then the alignment a has no significance and can be disregarded.

The conditional translation probability 30 is parameterized, that is, includes model parameters 32 whose values can be adjusted to optimize or tune the conditional translation probability 30. By way of illustrative example, in the illustrative embodiments described herein the conditional translation probability 30 employs a log-linear model as follows:

$$P(e, a | f) = \frac{\exp\left(\sum_{k=1}^{K} \lambda_k h_k(e, a, f)\right)}{\sum_{(e',a') \in L} \exp\left(\sum_{k=1}^{K} \lambda_k h_k(e', a', f)\right)}, \quad (1)$$

where f denotes the source language content, L denotes a set of available candidate aligned translations, (e',a') denotes one translation belonging to the set L, (e,a) denotes a candidate aligned translation for which the conditional probability is computed, $h_k(\ldots)$, k=1, ..., K denotes a set of K feature functions, and $\lambda_k$, k=1, ..., K denotes the parameters 32 of the conditional translation probability.

To generate candidate aligned translations, a phrase table 34 containing source language-target language phrase pairs is used to construct possible aligned target language translations for multi-phrase source language content. For each source language phrase in the source language content, the phrase table 34 is searched for possible corresponding target language phrases, which are then combined with various alignments to generate candidate aligned translations.

Figure 2:
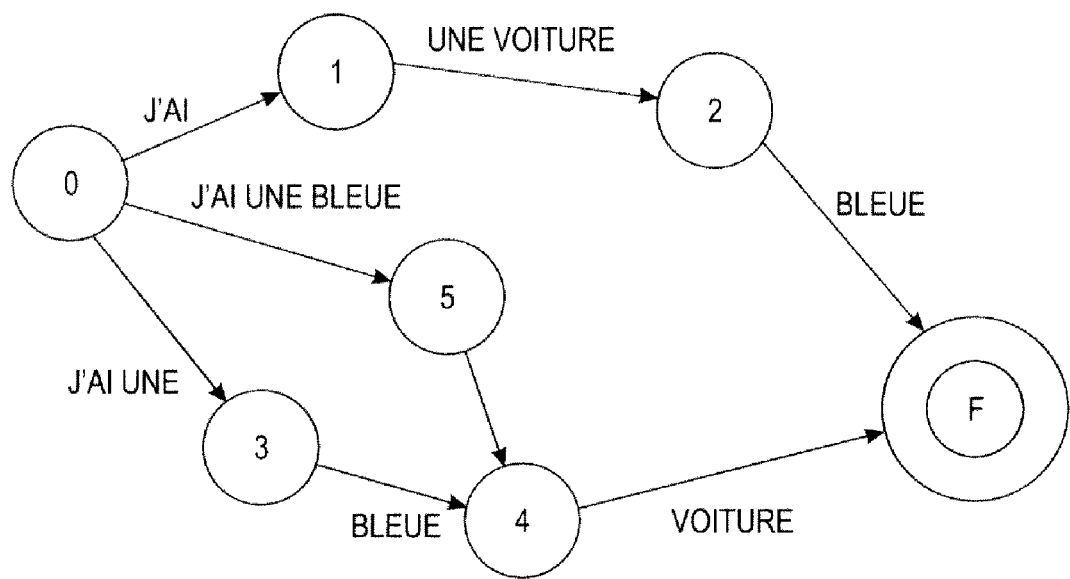
FIG. 2 diagrammatically shows an illustrative translation lattice representing some possible target French-language translations of the source English-language sentence "I have a blue car."

With continuing reference to FIG. 1 and with brief reference to FIG. 2, in some embodiments a decoder 36 performs translation lattice construction and updating to generate a translation lattice representing the candidate aligned translations. FIG. 2 illustrates a possible translation lattice for the translation of the English-language content "I have a blue car" into French. The translation lattice is traversed from the start state (designated "0") to the final state (designated (F)). The illustrative translation lattice of FIG. 2 represents three possible translations, corresponding to the traversal paths: 0-1-2-F; 0-3-4-F; and 0-5-4-F. More generally, however, the translation lattice may represent tens or hundreds or more possible translations for a given source language content.

With continuing reference to FIG. 1, the decoder 36 consults the phrase table 34 to generate the set L of available candidate aligned translations. The set L may include tens or hundreds or more possible translations for a given source language content, but is not necessarily exhaustive—in other words, there may be still yet other possible translations that are not included in the set L of available candidate aligned translations. The decoder 36 selects the final proposed translation 22 from the set L of available candidate aligned translations. The decoder 36 chooses the translation 22 from the set L of available candidate aligned translations so as to maximize the conditional translation probability 30 conditioned on the source language content 20.

With reference again to the illustrative log-linear conditional translation probability of Equation (1), it will be noticed that the denominator of Equation (1) does not depend on the particular candidate translation (e,a) for which the conditional probability is being computed. Thus, for the purpose of maximizing the conditional probability of Equation (1) respective to candidate translation (e,a), the denominator can be omitted, and the exponential in the numerator can also be dropped. Thus, the decoder 36 suitably selects the translation 22 as the optimal translation (e*,a*) as follows:

$$(e^*, a^*) = \underset{e,a}{\operatorname{argmax}} \left( \sum_{k=1}^{K} \lambda_k^{opt} h_k(e, a, f) \right), \quad (2)$$

where $\lambda_k^{opt}$, k=1, . . . , K denotes values for the parameters 32 of the conditional translation probability 30 that are optimized for the translation task, and (e*,a*) denotes the translation 22.

With brief reference again to FIG. 2, finding the optimal translation according to Equation (1) or Equation (2) is NP-complete. In a suitable approach which is faster, a beam-search heuristic algorithm is used to solve the problem approximately. In one such approach, the decoder 36 proceeds by progressively extending translation prefixes by adding one new phrase at a time, and correspondingly "consuming" portions of the source sentence. Each prefix is associated with a node in a graph, and receives a score according to the model. Whenever two prefixes having exactly the same possible extensions are detected, the lower-scoring one is merged into the other, thus creating a re-entrancy in the directed graph, which has then the characteristics of a lattice (see the example of FIG. 2). Edges in the lattice are labeled with the phrase pair that was used to perform the corresponding extension, the source word positions that were covered in doing the extension, and the corresponding increment in model score.

As used with reference to Equation (2), and as used generally herein, terms such as "optimize", "minimize", "maximize", and so forth are to be broadly construed as encompassing approximate or non-global optimization, minimization, maximization, or so forth. For example, in evaluating Equation (2) it is to be understood that the evaluation is over the set of available candidate aligned translations, which may not include the globally best translation. Moreover, even if the globally best translation is included in the set of available candidate aligned translations, the evaluation of Equation (2) may employ a non-exhaustive optimization that may identify a locally best translation rather than the globally best translation. Similar broad construction is understood to apply respective to optimization of the parameters 32 of the conditional translation probability.

The parameters $\lambda_k$, k=1, . . . , K 32 determine the relative importance of the different feature functions $h_k$( . . . ), k= 1, . . . , K in the global score of Equation (1) or Equation (2). The parameters 32 are in some embodiments suitably tuned by cross-validation. More generally, the parameters 32 are tuned by a model parameters optimization engine 40 using a development dataset 42 comprising source language sentences having reference translations in the target language, for example supplied by a human translator. Although the model parameters optimization engine 40 is diagrammatically shown in FIG. 1 as an individual component of the SMT system 10, in operation the model parameters optimization engine 40 interacts with other cooperating SMT system components such as the translation model 30 and the decoder 36. (See, e.g. FIG. 4 and related discussion herein). In operation the optimization engine 40 searches the space of parameter vectors $\bar{\lambda}=[\lambda_1, \ldots, \lambda_K]^T$ to identify a parameter vector $\bar{\lambda}^{opt}=[\lambda_1^{opt}, \ldots, \lambda_K^{opt}]^T$ that minimizes the error between translations of the source language sentences of the development dataset 42 made by the decoder 36 employing the translation model 30 with the optimized parameter values $\bar{\lambda}^{opt}$. The optimization engine 40 operates on a translation pool 44 containing candidate translations of the source language content generated (in the illustrated embodiment) by the decoder 36. In some suitable embodiments, the error is suitably measured by an error measure such as the BLEU error metric 46 defined in accordance with the bilingual evaluation understudy (BLEU) method. See, e.g. Papineni et al., "Bleu: a method for automatic evaluation of machine translation", in ACL '02: Proceedings of the 40th Annual Meeting on Association for Computational Linguistics, pages 311-318 (Philadelphia, Pa., USA, 2002), which is incorporated herein by reference in its entirety. The BLEU error metric 46 measures the geometric mean of the precisions with which the translation produced by the SMT recovers n-grams of different orders from the available reference translation(s).

The optimization performed by the model parameters optimization engine 40 is suitably a type of Minimum Error Rate Training (MERT). The algorithm starts by initializing the parameter vector $\bar{\lambda}$. In embodiments disclosed herein, for each source sentence in the development dataset 42, the translation pool 44 is initialized with a set of candidate translations generated by sampling available candidate aligned translations for the source language sentence in accordance with the conditional translation probability 30. Using the translation pool 44 and the corresponding reference translations, an optimization procedure is run by the optimization engine 40 to update the parameter vector to an updated value $\bar{\lambda}'$ which has reduced error for the translation pool 44 as compared with the vector $\bar{\lambda}$, as measured by BLEU or another suitable error metric. Additional candidate aligned translations are then added to the translation pool 44 by further sampling of the available candidate aligned translations for the source language sentences of the development dataset 42, again in accordance with the conditional translation probability. The additional candidate aligned translations are merged into the translation pool 44, and the process is repeated iteratively until a stopping criterion is met.

The process implemented by the optimization engine 40 has some similarity with a "Best-N" MERT algorithm such as is described in Och, "Minimum error rate training in statistical machine translation", in ACL '03: Proceedings of the 41$^{st}$ Annual Meeting on Association for Computational Linguistics, pages 160-167 (Sapporo, Japan, 2003), which is incorporated herein by reference in its entirety. In the Best-N MERT approach, the translation pool is updated in each iteration with a list of N-best scoring candidate translations according to the model using the current values of the model parameters. In contrast, the approach of the optimization engine 40 is to add candidate aligned translations to the translation pool 44 for each source language sentence of the dataset 42 by sampling available candidate aligned translations for the source language sentence in accordance with the conditional translation probability 30 conditioned on the source language sentence.

The Best-N procedure provides computational efficiency, based on the observation that BLEU only depends on the translation receiving the highest score by the translation model in the translation pool. This in turn means that, for any given source language sentence, its contribution to BLEU changes only when the value of the parameters change in such a way that the candidate translation ranking highest according to the model switches from one candidate translation to another. This situation does not change when one considers all the source language sentences in a development set instead of just one: while varying the X vector, the BLEU score changes only when there is a change at the top of the ranking of the alternatives for at least one source language sentence in the set. In other words, BLEU is piece-wise constant in $\bar{\lambda}$. Best-N MERT then proceeds in a computationally efficient manner by performing an iterative line search by fixing each time the value of all components of $\bar{\lambda}$ except one: for such a free parameter a global optimum can be identified by enumerating all the points that cause a change in BLEU. The value of the component is then fixed at the middle of an interval with maximum BLEU, and the procedure is iterated until convergence. Since the error function is highly irregular, and the iterative line search is not guaranteed to converge to a global optimum, the procedure is repeated multiple times with different initializations, and the best convergence point is retained.

The Best-N MERT algorithm assumes at each iteration that the set of candidates with a chance to make it to the top (for some value of the parameter vector $\bar{\lambda}$) is well represented in the translation pool. However, because the translation pool is formed by merging N-best lists, this assumption is easily violated in practice. Indeed, the N-best list often contains only candidates displaying minor differences, and represents only a small sample of alternative possible translations, strongly biased by the current parameter setting.

Thus, the Best-N approach is computationally efficient, but converges slowly if the initial parameter vector $\bar{\lambda}$ is far away from the optimal value $\bar{\lambda}^{opt}$. Additionally, the N-best translations tend to be similar to each other, which again tends to lead to slow convergence.

The process implemented by the optimization engine 40 also has some similarity with another MERT algorithm that is described in Macherey et al., "Lattice-based minimum error rate training for statistical machine translation", in EMNLP '08: Proceedings of the Conference on Empirical Methods in Natural Language Processing, pages 725-734 (Morristown, N.J., USA, 2008), which is incorporated herein by reference in its entirety. The approach of Macherey et al. extends the MERT algorithm so as to use the whole set of candidate translations compactly represented in the search lattice produced by the decoder, instead of only a N-best list of candidates extracted from it as in the Best-N approach. The use of the whole set of candidate translations is achieved via an elegant but relatively heavy dynamic programming algorithm that propagates sufficient statistics (called envelopes) throughout the whole search graph. The theoretical worst-case complexity of this algorithm reported in Macherey et al. is $O(|V||E|\log|E|)$, where V and E are the vertex set and the edge set of the lattice respectively.

The approach of Macherey et al. overcomes deficiencies of the Best-N approach by using all available candidate translations. Thus, there is substantially less concern about the N-best list being biased toward the current value of the parameter vector $\bar{\lambda}$, or of the N-best list comprising similar translations. However, even though the approach of Macherey et al. employs a relatively efficient algorithm, its use of all available candidate translations nonetheless results in slow per-iteration processing as compared with the Best-N approach. In other words, although the number of iterations is advantageously reduced by using all available candidate translations, the computational complexity of each iteration is substantially increased.

A difference in the approach of the optimization engine 40 of FIG. 1 from that of Macherey et al. is that the optimization engine 40 uses only a sampling of the available candidate translations, whereas Macherey et al. use all available candidate translations.

The approach of the optimization engine 40 of FIG. 1 produces a set of candidate aligned translations that is more representative of the complete distribution than an N-best list, while avoiding the computational complexity of propagating envelopes throughout the lattice as per the method of Macherey et al. Computational complexity of the approach of the optimization engine 40 of FIG. 1 is increased only marginally over the N-best list approach, while yielding significant improvements in final translation quality comparable with the improvements reported when using the whole lattice as per the method of Macherey et al.

Figure 3:
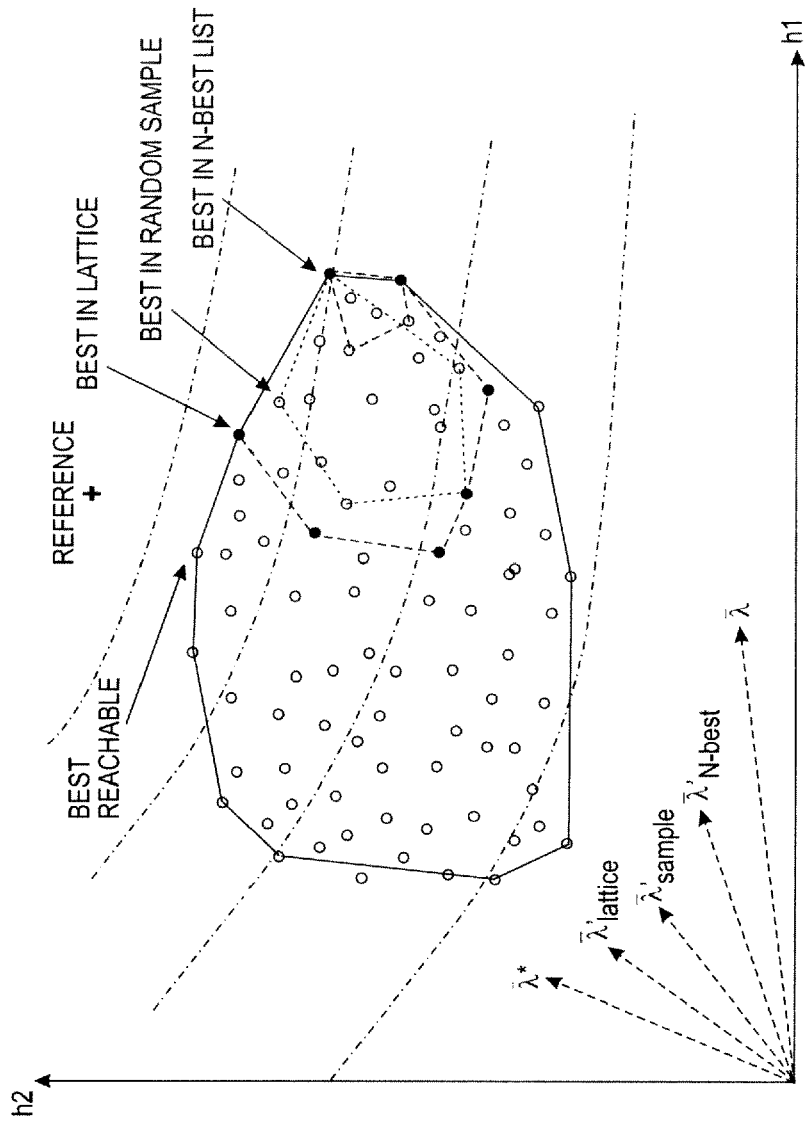
FIG. 3 diagrammatically shows reachable translations for a single sentence using a translation model having two feature functions.

With reference to FIG. 3, advantages of the sampling approach of the optimization engine 40 of FIG. 1 are further described by way of example. In FIG. 3, a simplified situation is shown, in which the conditional translation probability has only two feature functions h1, h2, and FIG. 3 plots all possible translations that can be generated using the phrases of the phrase table 34 for a single source language sentence. These possible translations are indicated by open or closed circle symbols in FIG. 3. The reference translation is indicated in FIG. 3 by a "+" symbol. The "best reachable" translation is also identified in FIG. 3. This is the translation that can be constructed using the phrase table 34 that is closest to the reference translation as measured by a suitable error or similarity measure such as BLEU.

A current value for the parameter vector $\bar{\lambda}$ is indicated in FIG. 3, along with the next iteration the parameter vector $\bar{\lambda}_{N-best}$ which would be generated by a single iteration of the N-best MERT algorithm. The limited scope of N-best lists (that is, limited to the N-best candidate translations for the current value of $\bar{\lambda}$) rules out many alternative translations that would receive the highest score for some other value or values of the parameter vector $\bar{\lambda}$. As shown by the small dashed polygon in FIG. 3, the scope of the N-best lists is limited to the extreme right end of the set of available translations.

The complete set of translations that can be produced using the phrase table 34 (also called the "reachable translations" herein) for the source sentence is represented in FIG. 3 as a set of vectors (i.e., circle symbols) in the space spanned by the feature functions h1, h2. Not all such translations stand a chance to receive the highest score for any value of the parameter vector, though. Indeed, if translations h, h', h" are such that $h_k \leq h_k' \leq h_k''$ for all feature k, then there is no value of $\overline{\lambda}$ that will give to h' a score higher than both h and h". The candidate translations that would rank first for some value of the $\overline{\lambda}$ parameter vector are those on the convex envelope of the overall candidate set (this is the outermost polygon in FIG. 3, drawn with a solid line and encompassing all the available candidate translations). The set of candidate translations represented by the translation lattice is a subset enclosed in the larger dashed polygon in FIG. 3. This set of available candidate translations defined by the translation lattice is biased to contain translations ranking high according to the current values of the parameter vector $\overline{\lambda}$ used to produce it, because of the pruning strategies that guide the construction of the translation lattice. Both the N-best list and the sampling approach of the optimization engine 40 of FIG. 1 are further subsets of the set of available candidate translations defined by the translation lattice. The N-best list is very biased towards available candidate translations that score high with the current values of the parameter vector $\overline{\lambda}$: its convex envelope (that is, the smaller dashed polygon) is very different from the envelope of the set of reachable translations (the outermost solid polygon), and is also very different from the envelope of the available translations defined by the translation lattice (the larger dashed polygon). As seen in FIG. 3, the "best in N-best list" candidate translation is very far away from the "best in lattice" candidate translation which is the available candidate translation of the translation lattice that is closest to the reference translation (marked by the "+" symbol).

The convex envelope of a sampling of the available candidate aligned translations (the larger dashed polygon) for the source language sentence, sampled from the translation lattice in accordance with the conditional translation probability, is indicated by the dotted polygon in FIG. 3. The sampling will generally be closer to the envelope of the whole translation lattice, as compared with the envelope of the N-best list. In FIG. 3, the best candidate translation from the sampling is labeled "best in random sample".

With continuing reference to FIG. 3, curves shown in FIG. 3 indicate regions of constant loss (that is, iso-BLEU score). FIG. 3 is diagrammatic, and these iso-BLUE score lines are typically substantially more irregularly shaped than as depicted in FIG. 3. For the source sentence, then, the optimal choice of the parameters would be around $\overline{\lambda}^*$. Performing an optimization step based on the random sample envelope would result in a more marked update ($\overline{\lambda}_{sample}$) in the direction of the best parameter vector than if an N-best list is used ($\overline{\lambda}_{N-best}$). While FIG. 3 shows a simplified example with only two feature functions, in practice the number of feature functions will be substantially larger, with between five and twenty feature functions being typical for some SMT systems. In such cases, a substantially larger fraction of the candidate translations will tend to lie on the convex envelope of the set, and not inside the convex hull.

In sum, the optimizing including adding candidate aligned translations to the translation pool by sampling available candidate aligned translations for a source language sentence in accordance with the conditional translation probability 30, as disclosed herein, provides translation pool additions that are substantially better (in terms of likelihood of movement toward the reference translation) as compared with the N-best MERT approach, while having computational complexity comparable with the N-best MERT approach and substantially lower than the "whole lattice" approach of Macherey et al.

Figure 4:
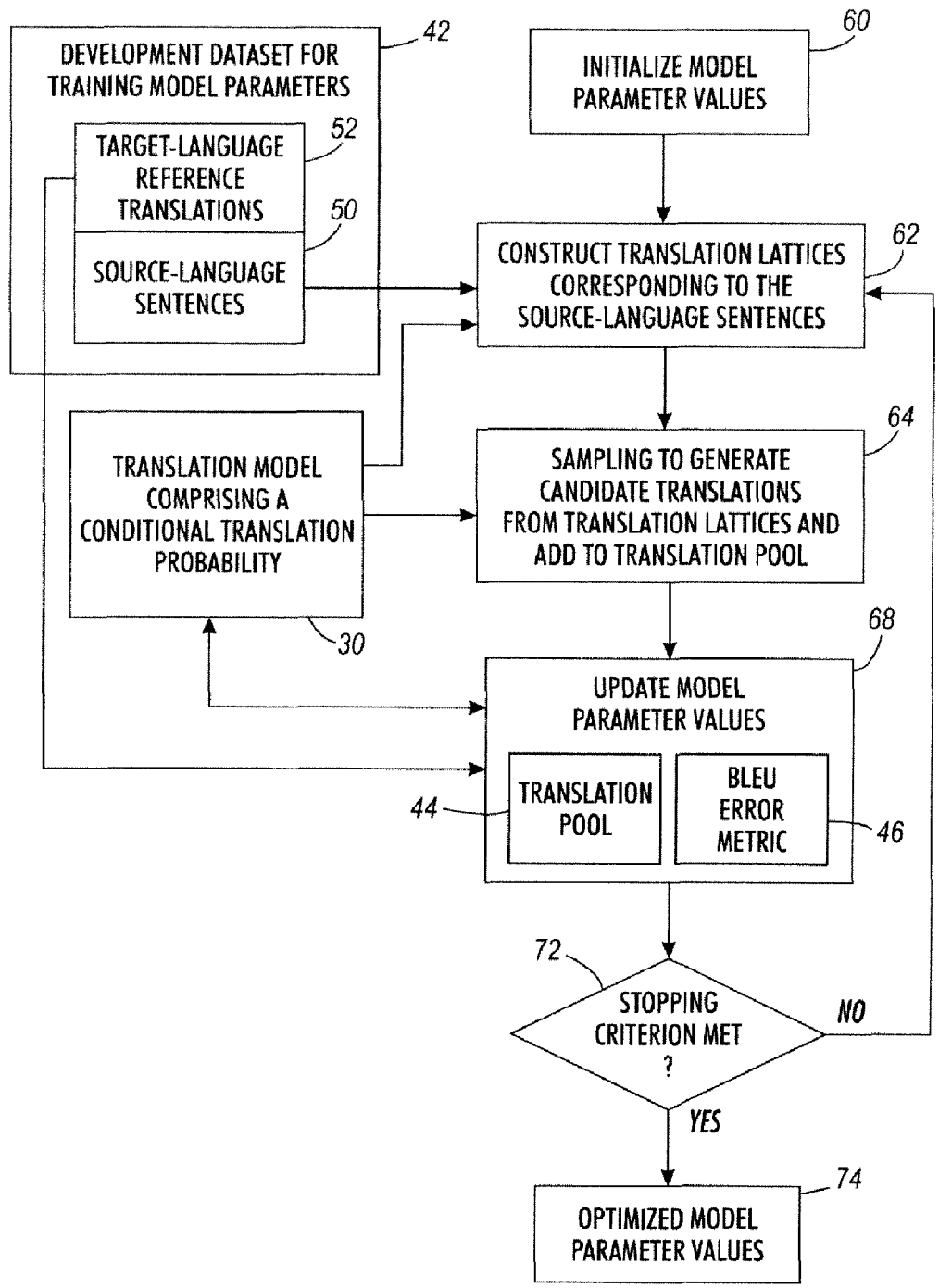
FIG. 4 diagrammatically illustrates operation of the model parameter optimization engine of the SMT system of FIG. 1.

With reference to FIG. 4, some illustrative embodiments of parameter optimization suitably performed by the model parameters optimization engine 40 are described. In FIG. 4, the development dataset 42 is shown as including the source-language sentences 50 and the corresponding target-language reference translations 52. In an operation 60, the model parameters are initialized. Substantially any initialization procedure is suitable. In some embodiments the parameters are initialized to equal values, e.g. if there are K parameters then each parameter is set to an initial value of 1/K (so as to provide the initial parameter vector $\overline{\lambda}$ normalized to unity). If a priori information is available suggesting better initial weight values, this information is suitably used in the initialization operation 60. In an operation 62, the decoder 36 (see FIG. 1) is used to construct translation lattices corresponding to the source-language sentences 50. The operation 62 references the phrase table 34 (see FIG. 1) in constructing the translation lattices.

In an operation 64, the model parameters optimization engine 40 (see FIG. 1) samples the translation lattice for each source-language sentence to generate candidate translations for addition to the translation pool 44. The sampling is in accordance with the conditional translation probability 30, suitably using the current parameter values of the current parameter vector $\overline{\lambda}$.

The first iteration of the operation 64 effectively initializes the translation pool 44, and so N sampled candidate translations are added to the translation pool 44 in the initial iteration. In subsequent iterations, the operation 64 of adding candidate translations to the translation pool 44 by sampling in accordance with the conditional translation probability entails merging the newly sampled candidate translations with the candidate translations already contained in the translation pool 44. Thus, if a newly sampled candidate translation is already in the translation pool 44, it is not "added again" but rather the new sampling is discarded. In this case the number of candidate translations added during that iteration is less than N. In an alternative approach, if a newly sampled candidate translation is already in the translation pool 44 then another candidate translation may be sampled so as to keep the number of added candidate translations at N for each iteration.

An operation 68 updates the model parameters of the parameters vector $\overline{\lambda}$ to obtain better parameter values as measured by a suitable metric comparing the candidate translation selected by the decoder 36 (see FIG. 1) for each source-language sentence 50 with the corresponding reference translation 52. In a suitable embodiment, the parameters update operation 68 employs the BLEU error metric 46, although other error metrics are also contemplated. The update operation 68 operates similarly to the corresponding operation of a Best-N MERT algorithm, for example, as described in Och, "Minimum error rate training in statistical machine translation", in ACL '03: Proceedings of the 41$^{st}$ Annual Meeting on Association for Computational Linguistics, pages 160-167 (Morristown, N.J., USA, 2003), which is incorporated herein by reference in its entirety. However, the operation 68 operates on the translation pool 44 constructed by sampling of the translation lattice in the operation 64, where the sampling is in accordance with the conditional translation probability 30.

At a decision operation 72, a suitable stopping criterion is employed to determine whether further iterations should be performed. The stopping criterion can be based, for example, on the iteration-to-iteration improvement in the value of the BLEU metric 46, and/or a maximum number of iterations stopping criterion, and/or based on a threshold for the norm of the update to the parameter vector $\bar{\lambda}$, or so forth. If iterating is to continue, flow returns to the translation lattice construction operation 62 to extend or update the translation lattice, and the extended or updated translation lattice is then sampled by the sampling operation 64 to perform additional sampling using the conditional translation probability 30 with parameter vector values updated by the update operation 68 of the previous iteration. In some embodiments (not shown), it is alternatively contemplated for flow to return for the next iteration directly to the sampling operation 64, without first employing the construction operation 62 to extend or update the lattice.

A suitable implementation of the sampling operation 64 is described. In this approach, N candidates are sampled from the translation lattice according to the probability distribution over paths induced by the model 30, given the current setting of the $\bar{\lambda}$ parameters. The sampling proceeds from the root node of the translation lattice, corresponding to an empty translation candidate covering no words of the source-language sentence 50, by choosing step by step the next edge to follow. The probability distribution for each possible follow-up is the posterior probability of following the edge given the path prefix derived from the translation lattice. In a suitable approach, the posterior probability is obtained via a preliminary backward sweep. Said another way, the candidate translation is sampled in accordance with the conditional translation probability 30, for example as set forth in Equation (1), by traversing the translation lattice from its root node to its final node wherein each transition from a current node to a next node is selected based on conditional translation probabilities (again, given by Equation (1)) of the available edges leading away from the current node.

Feature functions are incremental over the edges of the translation lattice. Accordingly, the non-normalized probability of a path including m edges or transitions is given by:

$$P(e_1, \ldots, e_m) = \exp\left(\sum_{i=1}^{m} \sigma(e_i)\right), \quad (3)$$

where:

$$\sigma(e_i) = \sum_{k=1}^{K} \lambda_k h_k(e_i) \quad (4)$$

is the score of the edge $e_i$. With a minor notational change the score $\sigma(e_i)$ is also denoted herein as $\sigma(n_{j,k})$, where the edge $e_i$ goes from translation lattice node $n_j$ to translation lattice node $n_k$. Further denoted herein as $\sigma(n_i)$ is the score of node $n_i$, that is, the logarithm of the cumulative unnormalized probability of all the paths in the lattice that go from node $n^i$ to a final node. The unnormalized probability of selecting node $n_j$ starting from $n_i$ can then be expressed recursively as follows:

$$S(n_j|n_i) \propto \exp(\sigma(n_j) + \sigma(n_{i,j})) \quad (5).$$

The scores required to compute these sampling probabilities can be obtained by a backward pass in the lattice. Let $P_i$ denote the set of successors of $n_i$. Then the total unnormalized log-probability of reaching a final state (i.e. with a complete translation) from $n_i$ is given by:

$$\sigma(n_i) = \log\left(\sum_{n_j \in P_i} \exp(\sigma(n_j) + \sigma(n_{i,j}))\right), \quad (6)$$

where $\sigma(n_i)=0$ is set if $P_i=\{\}$, that is, if $n_i$ is the final node of the translation lattice. At the end of the backward sweep, $\sigma(n_0)$ contains the unnormalized cumulative probability of all paths, that is, the partition function. Notice that this normalizing constant cancels out when computing local sampling probabilities for traversed nodes in the translation lattice.

Once the transition probability is known for each node, as per Equation (5), candidate translations are sampled by starting in the root node of the translation lattice and at each step randomly selecting among its successors, until the final node is reached. The whole sampling procedure is repeated as many times as the number of samples sought (e.g., N times in the case of sampling N candidate translations). After collecting samples for each source sentence 50, the whole list is used to grow the translation pool 44 by merging the list with the already-present contents (if any) of the translation pool 44.

An analysis of time complexity of the parameter optimization of FIG. 4 is now considered. For each line search in the inner loop of the MERT algorithm, all methods considered here (i.e., Best-N, sampling as per the model parameters optimization engine 40 of FIG. 1, or the approach of Macherey et al.) compute the projection of the convex envelope that can be scanned by leaving all components unchanged but one. If the translation pool 44 is created and updated using either N-best lists or sampling in accordance with the conditional translation probability 30, and M is the size of the translation pool 44, then computing the envelope can be done in time O(M log M) using the SweepLine algorithm. (See Algorithm 1 in Macherey et al., "Lattice-based minimum error rate training for statistical machine translation", in EMNLP '08: Proceedings of the Conference on Empirical Methods in Natural Language Processing, pages 725-734 (Morristown, N.J., USA, 2008), which is incorporated herein by reference in its entirety). As it is shown in Macherey et al., the lattice method for computing the envelope is O(|V||E|log|E|), where V is the vertex set of the lattice, and E is its edge set. In some embodiments of the decoder 36 there is a maximum limit D to the allowed distortion, and lattice vertices are organized in J priority queues (sometimes referred to as "stacks") of size at most a, where J is the length of the source sentence and a is a parameter of the decoder set by the user. Also, there is a limit K to the maximum number of source words spanned by a phrase, and only up to c alternative translations for a same source phrase are kept in the phrase table 34. Under these conditions, the number of outgoing edges E' from each lattice vertex can be bounded by a constant. A first way to see this is by considering that if an hypothesis is extended with a phrase, then the extended hypothesis must end up in a stack at most K stacks to the right of the original one. There are only aK places in these stacks, so |E'|≤aK holds. An alternative way to see this is to consider that after covering a given source phrase, the decoder 36 will only consider as an option covering a span of length 1≤k≤K in the source starting in a window of size 2D around the most recently covered source word. Since there are at most c alternative target phrases for each source phrase, it follows that:

$$|E'| \leq \sum_{k=1}^{K} c(2D-k) = cK\left(2D - \frac{K+1}{2}\right). \quad (7)$$

Since the number of edges leaving each node is bounded by a constant, it is $|E|=\Theta(|V|)$, and the method of Macherey et al. is $O(|V|^2 \log|V|)$. The maximum number of vertices in the translation lattice is limited by the capacity of the stacks—that is, $|V| \leq aJ$. This leads to a complexity of $O(J^2 \log J)$ for the inner loop of the method of Macherey et al.

The complexity is driven by the length of the source sentence in the case of the method of Macherey et al., and by the size of the translation pool in the case of both the N-best list method and the sampling method employed by the optimization engine 40 of FIG. 1 herein. The latter two methods are asymptotically more effective as long as the size of the sample/N-best list grows sub-quadratically in the length of the sentence.

The foregoing addresses the complexity of the innermost loop which searches for a global optimum along a line in the parameter space. This line search is repeated many times, and accordingly has a substantial impact on the overall complexity of each of the parameters optimization methods (top N, sampling, or the method of Macherey et al.). In the following, the different methods are considered in terms of the operations that are performed as part of the outer iteration, that is upon redecoding the development set with a new parameter vector.

For the N-best list method, this outer iteration entails constructing an N-best list from the translation lattice. This can be done in time linear in the size J of the sentence and in N with a backward sweep in the translation lattice. In the case of the method of Macherey et al., the outer iteration does not entail any operations at all, since the whole lattice is passed over for envelope propagation to the inner loop.

The sampling method implemented by the optimization engine 40 using the sampling described herein with reference to Equations (3)-(6) entails sampling N times the translation lattice according to the conditional probability distribution 30 induced by the weights on its edges. The approach of Equations (3)-(6) uses a dynamic programming approach for computing the posterior probabilities of traversing edges. In this phase each edge of the translation lattice is visited exactly once, hence this phase is linear in the number of edges in the lattice, hence under standard assumptions in the length J of the sentence for this case. Once posterior probabilities are computed for the translation lattice, N paths are sampled from it, each of which is composed of at most J edges (assuming all phrase pairs cover at least one source word). In order to select a new edge to traverse among all possible outgoing edges from the current node, the outgoing edges are suitably sorted into a binary search tree, storing intervals of cumulative non-normalized probabilities, and then a binary search is performed on it with a uniformly generated random number: if $|E'|$ is the number of successors of a node then the computational cost is $O(|E'|\log|E'|)$ the first time a node is ever sampled (not all nodes are necessarily ever sampled) to build the binary tree, and then $O(\log|E'|)$ for traversing the tree for each sampling operation. The overall cost for sampling N paths is thus $O(|E|+NJ(|E'|\log(|E'|)+\log(|E'|)))$. Under standard assumptions $|E'|$ is a constant, and $|E| \approx O(J)$, so the whole sampling is also $O(NJ)$, which is the same complexity as for extracting the N-best list.

Accordingly, it is concluded that the parameter optimization techniques disclosed herein, which employ sampling in accordance with the conditional translation probability 30 of the available candidate translations (for example, as encoded in a translation lattice) has computational complexity that is comparable with that of the N-best list approach. However, the sampling approaches disclosed herein provide substantially improved performance in terms of convergence speed and robustness in terms of likelihood of converging to a set of optimized parameters that is close to the ideal parameter values.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:

translating source language content in a source natural language to a target natural language using statistical machine translation (SMT) employing a conditional translation probability conditioned on the source language content; and optimizing values of parameters of the conditional translation probability by an iterative optimization process operating on a translation pool, the optimizing including adding candidate aligned translations to the translation pool by sampling available candidate aligned translations for a source language sentence in accordance with the conditional translation probability; wherein the conditional translation probability is quantitatively equivalent to:

$$P(e, a | f) = \frac{\exp\left(\sum_{k=1}^{K} \lambda_k h_k(e, a, f)\right)}{\sum_{(e',a') \in L} \exp\left(\sum_{k=1}^{K} \lambda_k h_k(e', a', f)\right)}$$

where f denotes the source language sentence, L denotes the set of available candidate aligned translations, (e, a) denotes a candidate aligned translation for which the conditional probability is computed, $h_k(\ldots)$, $k=1, \ldots, K$ denotes a set of K feature functions, and $\lambda_k$, $k=1, \ldots, K$ denotes the parameters of the conditional translation probability;

wherein the sampling comprises:

selecting a sampled candidate aligned translation by traversing a translation lattice representing the available candidate aligned translations for the source language sentence from its root node to its final node wherein each transition from a current node to a next node is selected based on conditional translation probabilities $$\sigma(e_i) = \sum_{k=1}^{K} \lambda_k h_k(e_i)$$

of the available edges $e_i$ leading away from the current node;

wherein the SMT and the optimizing are implemented by a SMT system embodied by at least one digital processor.

2. The method as set forth in claim 1, wherein the iterative optimization process employs the bilingual evaluation understudy (BLEU) method.

3. The method as set forth in claim 1, wherein for a current iteration of the iterative optimization process the sampling is in accordance with the conditional translation probability employing parameter values of the current iteration.

4. The method as set forth in claim 1, wherein the translating comprises computing:

$$(e^*, a^*) = \underset{e,a}{\operatorname{argmax}}\left(\sum_{k=1}^{K} \lambda_k^{opt} h_k(e, a, f)\right)$$

where $\lambda_k^{opt}$, k=1, . . . , K denotes the parameters of the conditional translation probability optimized by the optimizing, and (e*,a*) denotes the translation.

5. A non-transitory storage medium storing instructions executable on a digital processor to perform a method including (i) translating source language content in a source natural language to a target natural language based on a conditional translation probability conditioned on the source language content and (ii) tuning the conditional translation probability using a translation pool,
wherein the tuning includes:
selecting candidate aligned translations for a source language sentence having a reference translation by sampling available candidate aligned translations for the source language sentence in accordance with the conditional translation probability conditioned on the source language sentence; wherein the conditional translation probability for a translation (e,a) of source language content f is monotonically increasing with $$\exp\left(\sum_{k=1}^{K} \lambda_k h_k(e, a, f)\right)$$

where $h_k(\ldots)$, k=1, . . . , K denotes a set of K feature functions and $\lambda_k$, k=1, . . . , K denotes tuning parameters of the conditional translation probability;
wherein the selecting comprises:
constructing a translation lattice representing the available candidate aligned translations for the source language sentence; and
sampling the available candidate aligned translations by sampling paths through the translation lattice from its root node to its final node wherein each transition from a current node to a next node is selected based on conditional translation probabilities $$\sigma(e_i) = \sum_{k=1}^{K} \lambda_k h_k(e_i)$$

of the available edges $e_i$ leading away from the current node, and
adding the selected candidate aligned translations to the translation pool.

6. The storage medium as set forth in claim 5, wherein the tuning employs the bilingual evaluation understudy (BLEU) method.

7. The storage medium as set forth in claim 5, wherein the translating comprises computing:

$$t^* = \underset{t}{\operatorname{argmax}}\left(\sum_{k=1}^{K} \lambda_k^{opt} h_k(t, f)\right)$$

where $\lambda_k^{opt}$, k=1, . . . , K denotes the parameters of the conditional translation probability optimized by the optimizing, and t* denotes the translation.

8. An apparatus comprising:
a statistical machine translation (SMT) system employing a conditional translation probability conditioned on the source language content; and
a model parameters optimization engine configured to optimize values of parameters of the conditional translation probability using a translation pool comprising candidate aligned translations for source language sentences having reference translations, the model parameters optimization engine adding candidate aligned translations to the translation pool by sampling available candidate aligned translations in accordance with the conditional translation probability; wherein the conditional translation probability is quantitatively equivalent to:

$$P(e, a | f) = \frac{\exp\left(\sum_{k=1}^{K} \lambda_k h_k(e, a, f)\right)}{\sum_{(e', a') \in L} \exp\left(\sum_{k=1}^{K} \lambda_k h_k(e', a', f)\right)}$$

where f denotes the source language sentence, L denotes the set of available candidate aligned translations, (e, a) denotes a candidate aligned translation for which the conditional probability is computed, $h_k(\ldots)$, k=1, . . . , K denotes a set of K feature functions, and $\lambda_k$, k=1, . . . , K denotes the parameters of the conditional translation probability;
wherein the sampling comprises:
selecting a sampled candidate aligned translation by traversing a translation lattice representing the available candidate aligned translations for the source language sentence from its root node to its final node wherein each transition from a current node to a next node is selected based on conditional translation probabilities $$\sigma(e_i) = \sum_{k=1}^{K} \lambda_k h_k(e_i)$$

of the available edges $e_i$ leading away from the current node;
wherein the SMT system and the model parameters optimization engine are embodied by one or more digital processors.

9. The apparatus as set forth in claim 8, wherein the model parameters optimization engine is configured to iteratively optimize values of the parameters of the conditional translation probability, the model parameters optimization engine in each iteration adding candidate aligned translations to the translation pool by sampling available candidate aligned translations in accordance with the conditional translation probability with parameter values of the current iteration.

10. The method as set forth in claim 9, wherein the iterative optimization process employs the bilingual evaluation understudy (BLEU) method.

11. An apparatus comprising:
A non-transitory storage medium as set forth in claim 5; and
A digital processor in operative communication with the non-transitory computer-readable storage medium and configured to execute instructions stored on the non-transitory computer-readable storage medium.

* * * * *